US012610878B2

(12) United States Patent
Reiser

(10) Patent No.: US 12,610,878 B2
(45) Date of Patent: Apr. 28, 2026

(54) METHOD FOR ASCERTAINING STATUS INFORMATION REGARDING A STATUS OF AN AGRICULTURAL WORKING TOOL OF AN AGRICULTURAL WORKING MACHINE

(71) Applicant: Robert Bosch GmbH, Stuttgart (DE)

(72) Inventor: David Reiser, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 18/503,734

(22) Filed: Nov. 7, 2023

(65) Prior Publication Data

US 2024/0164238 A1      May 23, 2024

(30) Foreign Application Priority Data

Nov. 23, 2022    (DE) ..................... 10 2022 212 490.1

(51) Int. Cl.
*A01B 69/00*          (2006.01)
*A01C 21/00*          (2006.01)

(52) U.S. Cl.
CPC .......... *A01B 69/004* (2013.01); *A01C 21/005* (2013.01)

(58) Field of Classification Search
CPC ... A01B 69/004; A01B 79/005; A01C 21/005; A01C 23/008; A01C 23/047
See application file for complete search history.

(56) References Cited

U.S. PATENT DOCUMENTS

2017/0357267 A1* 12/2017 Foster .................. G01C 21/005

FOREIGN PATENT DOCUMENTS

DE      10 2016 116 809 A1      3/2018
DE      10 2018 102 361 A1      8/2019

* cited by examiner

*Primary Examiner* — Calvin Cheung
(74) *Attorney, Agent, or Firm* — Maginot, Moore & Beck LLP

(57)                    ABSTRACT

A method for ascertaining status information regarding a status of an agricultural working tool of an agricultural working machine used for treating an agricultural area is disclosed. The agricultural working tool is tracked by way of a radar sensor in order to obtain radar sensor data, and the status information regarding the status of the agricultural working tool is ascertained using the radar sensor data of the radar sensor by way of a computing unit.

18 Claims, 1 Drawing Sheet

METHOD FOR ASCERTAINING STATUS INFORMATION REGARDING A STATUS OF AN AGRICULTURAL WORKING TOOL OF AN AGRICULTURAL WORKING MACHINE

This application claims priority under 35 U.S.C. § 119 to patent application no. DE 10 2022 212 490.1, filed on Nov. 23, 2022 in Germany, the disclosure of which is incorporated herein by reference in its entirety.

BACKGROUND

The disclosure proceeds from a method for ascertaining status information regarding a status of an agricultural working tool of an agricultural working machine used for treating an agricultural area, and an agricultural working machine comprising an agricultural working tool for treating an agricultural area and a radar sensor for ascertaining status information regarding a status of the agricultural working tool according to the description set forth below.

Field sprayers are important machines in modern agriculture. They are mainly used for crop management in arable and vegetable farming (conventional and organic). These are available as attached tractors and self-propelled units. Typical applications are the uniform distribution of herbicides, pesticides and fungicides, fertilizers, as well as metals (e.g., copper) in organic farming.

To avoid drift caused by wind and to ensure good and effective wetting of the plants, the boom must be guided over the crop as exactly as possible at the same distance. This must also be possible at high operating velocities of up to 30 km/h. Older models use touch sensors for vertical boom control. In new machines, vertical guidance is implemented using multiple ultrasonic sensors mounted on the boom. However, due to the 1D tracking of the environment, this method has difficulty working reliably under changing conditions. Holes in the stand will result in less spacing than planned, and individual tall plants can result in high spacing, resulting in more spray drift. In addition, 1D tracking does not enable flexible and predictive linkage adjustment to be implemented depending on travel velocity.

DE 10 2016 116 809 A1 discloses a control system for an agricultural vehicle having a distribution boom for spreading material, e.g. fertilizer, pesticide or seed, and having a plurality of radar sensors which are arranged on the distribution boom in order to ascertain the distance from the distribution boom to the ground, as well as the velocity of the distribution boom.

SUMMARY

The object of the present disclosure is to provide a method for ascertaining status information regarding a status of an agricultural working tool of an agricultural working machine used for treating an agricultural area, said method comprising the following steps:

tracking the agricultural working tool using a radar sensor in order to obtain radar sensor data; and ascertaining the status information regarding the status of the agricultural working tool using the radar sensor data of the radar sensor by means of a computing unit.

The method described hereinabove can, in particular, be a computer-implemented method for ascertaining status information regarding a status of an agricultural working tool of an agricultural working machine used for treating an agricultural area, said method comprising the steps hereinabove.

The present application further relates to a computing unit, which is configured to obtain radar sensor data from an agricultural working tool of an agricultural working machine tracked by means of a radar sensor, and to ascertain status information regarding a status of the agricultural working tool using the radar sensor data from the radar sensor.

The object of the present disclosure is also to provide an agricultural working machine having an agricultural working tool used for treating an agricultural area and a radar sensor for ascertaining status information relating to a status of the agricultural working tool, whereby the radar sensor is arranged and designed to track the agricultural working tool in order to obtain radar sensor data for ascertaining status information relating to the agricultural working tool.

Using the method and device according to the disclosure, it is then possible to generate 3D measurement data from an agricultural working tool in a very robust manner, which enables very accurate and robust control and which can further be used for further tasks or for generating further data/information.

The method is intended for agricultural purposes. In the context of the present disclosure, the term "agricultural purpose" can be understood to mean a purpose directed to economic cultivation of crop plants.

The term "agricultural area" can be understood to mean an area of land used for agricultural purposes, an area of land used for the cultivation of crops, or a parcel of such area or cultivated area. The agricultural area can therefore be arable land, grassland, or a plantation. The plants can comprise cultivated plants or crops whose fruit is used agriculturally, e.g., as food, feed, or as an energy crop, as well as weeds or weed-like plants.

For the purposes of this application, the term "agricultural area" comprises the land or arable land together with the plant crop and any objects located on the land or arable land.

The agricultural working machine is preferably designed to be mobile. The agricultural working machine can comprise a motorized land vehicle and/or motorized air vehicle, or can be designed as a motorized land vehicle and/or motorized air vehicle. The agricultural working machine can be manually controlled or self-propelled or autonomous. The agricultural working machine can comprise a traction engine, e.g., a tractor or a tow truck or a self-propelled or autonomous robot, or be designed as a traction engine. Alternatively or additionally, the agricultural working machine can comprise an attachment and/or a trailer, or it can also be designed as an attachment or trailer.

Advantageously, the agricultural working machine is designed to perform the method in an automated manner in order to enable the fast, reliable, and efficient treatment of an agricultural area.

The agricultural working machine can be fixed or detachably connected to the agricultural working tool. The agricultural working tool is designed to treat the agricultural area. The treatment is intended to comprise, within the scope of the present application, treatment of agricultural area. The treatment is in particular intended to comprise the spreading of substances and liquids (biological, chemical, metallic) and/or mechanical processing or treatment. The agricultural working tool is preferably selected from the group consisting of: an actively guided working tool, e.g. a spraying unit, in particular a field sprayer having sprayer boom for spreading a spraying agent and/or a fertilizing agent, a rotating working tool, in particular a windrower, planter, or finger hoe. The agricultural working tool is preferably a field sprayer or a mechanical tool for weed control.

The agricultural working tool is tracked by means of a radar sensor to obtain radar sensor data in order to ascertain status information regarding the agricultural working tool. Accordingly, the radar sensor is arranged and designed or programmed to track the agricultural working tool in order to obtain radar sensor data for ascertaining status information regarding the agricultural working tool. Depending on the arrangement of the radar sensor and the design of its (3D) measuring range, only part of the agricultural working tool or the entire agricultural working tool can be tracked or trackable by means of the radar sensor.

The tracked field section in this case corresponds to the section of the agricultural area located in a (3D) measuring range of the radar sensor.

The agricultural working tool is thereby preferably tracked using at least one radar reflector arranged on the agricultural working tool, in particular a plurality of radar reflectors, by means of the radar sensor. Accordingly, at least one radar reflector, in particular a plurality of radar reflectors, is/are arranged on the agricultural working tool in order to track the agricultural working tool. This measure enables the agricultural working tool to be tracked better and more robustly by means of the radar sensor.

In the case of a field sprayer, the structure of the metallic sprayer boom can be well extracted from the radar data due to, e.g., the metallic property of strongly reflecting radar waves. A fitting algorithm (e.g., RANSAC) can be used to ascertain the exact position of the sprayer boom in 3D space relative to the position of the radar sensor from this radar data.

It is advantageous if, during the step of tracking, a field section of the agricultural area, in particular a field section located directly below the agricultural working tool and/or a field section of the agricultural area located ahead of the agricultural working tool in the direction of movement (direction of travel or flight) of the agricultural working machine is further tracked in order to ascertain the status information. Accordingly, it is advantageous if the radar sensor for ascertaining the status information is arranged and designed to further track a field section of the agricultural area, in particular a field section located directly below the agricultural working tool and/or a field section of the agricultural area located ahead of the agricultural working tool in the direction of movement (direction of travel or flight) of the agricultural working machine. The tracked field section in this case corresponds to the section of the agricultural area located in a (3D) measuring range of the radar sensor. This measure can be used to ascertain the status of the agricultural working tool relative to the agricultural area. In particular, the status information can advantageously be ascertained from a current status, e.g. relative to the field section located directly below the agricultural working tool, and a precalculated status, e.g. relative to the field section located ahead of the agricultural working tool in the direction of movement (direction of travel or flight) of the agricultural working machine. A predictive control or regulation of the agricultural working machine or the agricultural working tool is enabled thereby.

Reflections from the crop surface of the agricultural area can be identified by reflective 3D measurement points. Using these crop points (3D point cloud), the nature of the surface can be determined and provided by means of a suitable algorithmic method for further processing at the machine control unit. One possibility is to, e.g., place a matching 3D plane through the measuring points. The crop surface can thereby be calculated by, e.g., an averaged 3D plane in space.

In this case, the radar sensor is preferably arranged on a traction engine or an attachment or a trailer of the agricultural working machine, in particular on the side of this/these, in order to track the agricultural working tool and optionally the field section of the agricultural area. The radar sensor can, e.g., be arranged on the side of a chassis of the traction engine unit or the attachment or trailer.

Understandably, the position and location of the radar sensor are adapted to the application or the conditions such that sufficiently strong reflections of the working tool and, optionally, of the agricultural area (with the plant crop, etc.) are tracked. Accordingly, the radar sensor is arranged and designed such that the (3D) measuring range of the radar sensor can track the agricultural working tool as well as the surface of the agricultural area (with the plant crop, etc.) in a field section located directly below the agricultural working tool and/or a field section located ahead of the agricultural working tool in the direction of movement of the agricultural working machine.

The step of tracking is preferably performed or executed during a pass or flight of the agricultural working tool or agricultural working machine over the agricultural area. However, the step of tracking can also be performed or executed during a standstill of the agricultural working tool or the agricultural working machine.

Using the radar sensor data from the radar sensor, the status information regarding the status of the agricultural working tool is then ascertained by means of a computing unit. Accordingly, the agricultural working machine advantageously comprises a computing unit which is configured to execute and/or control at least one step of a method according to the disclosure.

Preferably, in the ascertaining step, using the obtained radar sensor data, a 3D point cloud of the agricultural working tool and, optionally, the tracked field section is generated by means of the computing unit to ascertain the status information. Further preferably, using the generated 3D point cloud, a 3D surface contour, in particular one or a plurality of averaged 3D planes for the tracked field section can thereby be determined by means of the computing unit in order to ascertain the status information. In other words, a vertical profile of the tracked field section is calculated.

The status is preferably selected from the group consisting of:

position and/or orientation of the agricultural working tool relative to the tracked field section of the agricultural area and/or the agricultural working machine, distance, in particular vertical distance of the agricultural working tool to the tracked field section of the agricultural area, velocity, in particular magnitude and/or direction of a velocity of the agricultural working tool relative to the agricultural area, or combinations thereof.

In the case of the field sprayer, the current distance can be determined from the position of the calculated plane and line at any point on the sprayer boom. For this purpose, a distance x can be selected in the ascertained line function and a point in the 3D space can be defined by inserting it into the line function. Then the distance of the point to the plane can be calculated.

By moving the ascertained line function in the direction of movement of the agricultural working machine, any target distance can now be ascertained. This target distance can be adjusted proportionally to the velocity of the movement.

Based on the position and/or orientation of the agricultural working tool, it is also possible to ascertain, among other things, a ready-to-work status of the agricultural working tool. A ready-to-work status can be given, e.g., when the agricultural working tool has reached a defined position and/or orientation. In the case of a field sprayer, ready-to-work status can be present when the sprayer boom is fully folded out.

The distance is, in particular, a vertical distance (height difference) of the agricultural working tool to the tracked field section of the agricultural area, i.e., the surface soil as well as the plant crop located in it and, optionally, the objects located on it. As a result, among other things, a crop height of the crop can also be ascertained, field edges and/or tramlines and/or holes can be tracked, potentially colliding objects (e.g., trees, road signs, buildings or similar) can be tracked using the agricultural working tool.

The step of ascertaining is preferably performed or executed during a pass or flight of the agricultural working tool or agricultural working machine over the agricultural area. However, the step of ascertaining can also be performed or executed during a standstill of the agricultural working tool or the agricultural working machine.

Advantageously, a step of storing the status information in a storage unit of the agricultural working machine or an external storage unit, in particular cloud, and/or outputting the status information to a display unit of the agricultural working machine or an external display unit, in particular a smartphone or tablet, is provided. The display unit can be, e.g., an external display or operator terminal or HMI device, which is designed, e.g., as a smartphone or tablet. This measure can be used, e.g., to output and/or evaluate information regarding the crop height, and/or fluctuations in the sprayer boom, and/or a collision warning with tracked objects.

Preferably, the step of storing is performed or executed during a pass or flight of the agricultural working tool or agricultural working machine over the agricultural area. However, the step of storing can also be performed or executed during a standstill of the agricultural working tool or the agricultural working machine.

It is further advantageous if a step of controlling and/or regulating a unit of the agricultural working machine is provided, depending on the ascertained status information, in order to achieve and/or adjust a target status of the agricultural working tool. In particular, the unit can be the agricultural working tool and/or a positioning unit for the agricultural working tool and/or a drive unit of the agricultural working machine. Accordingly, the agricultural working machine can preferably comprise a positioning unit which is designed to adjust a target position and/or target orientation of the agricultural working tool, in particular relative to the tracked field section of the agricultural area, depending on the status information.

The target status is thereby preferably selected from the group consisting of:

target position and/or target orientation of the agricultural working tool relative to the tracked field section of the agricultural area and/or the agricultural working machine, target distance, in particular vertical target distance from the agricultural working tool to the tracked field section of the agricultural area, target velocity, in particular magnitude and/or direction of a target velocity of the agricultural working tool relative to the agricultural area, target quantity to be spread, in particular or combinations thereof.

As a result, vertical control of the agricultural working tool, spray/pressure control for a spray or fertilizer to be applied, and/or collision prevention can, e.g., be performed depending on the ascertained status information.

The step of controlling and/or regulating is preferably performed or executed during a traverse or flight of the agricultural working tool or agricultural working machine over the agricultural area. However, the step of controlling and/or regulating can also be performed or executed during a standstill of the agricultural working tool or the agricultural working machine.

The computing unit is designed or configured for point cloud processing, so it can perform calculation steps or image processing steps for performing the method according to the disclosure. Accordingly, each computing unit comprises corresponding point cloud processing software. The computing unit can, e.g., be a signal processor, a microcontroller or the like, and the storage unit can be a flash memory, an EPROM, or a magnetic memory unit. The communication interface can be designed to read or output data wirelessly and/or in a wired manner, whereby a communication interface capable of reading or outputting data transmitted by wire can, e.g., read said data electrically or optically from a corresponding data transmission line or output the data to a corresponding data transmission line. Accordingly, the method according to the disclosure can, e.g., be implemented using software or hardware, or in a mixed form of software and hardware in the computing unit or a control device.

The computing unit can be completely or partially arranged on or integrated into the agricultural working machine. However, the computing unit can also be fully or partially integrated externally, e.g. in a cloud. The computing unit can therefore also be divided into different units, e.g. mobile and stationary units.

A computer program product or a computer program comprising program code that can be stored on a machine-readable carrier or storage medium, e.g., a semiconductor memory, a hard disk memory, or an optical memory, and can be used to perform, implement, and/or control the method steps according to one of the embodiments described hereinabove is advantageous as well, in particular when the program product or program is executed on a computer or a device.

BRIEF DESCRIPTION OF THE DRAWINGS

Exemplary embodiments of the disclosure are illustrated in the drawings and explained in greater detail in the subsequent description. Shown are.

DETAILED DESCRIPTION

Figure 1:
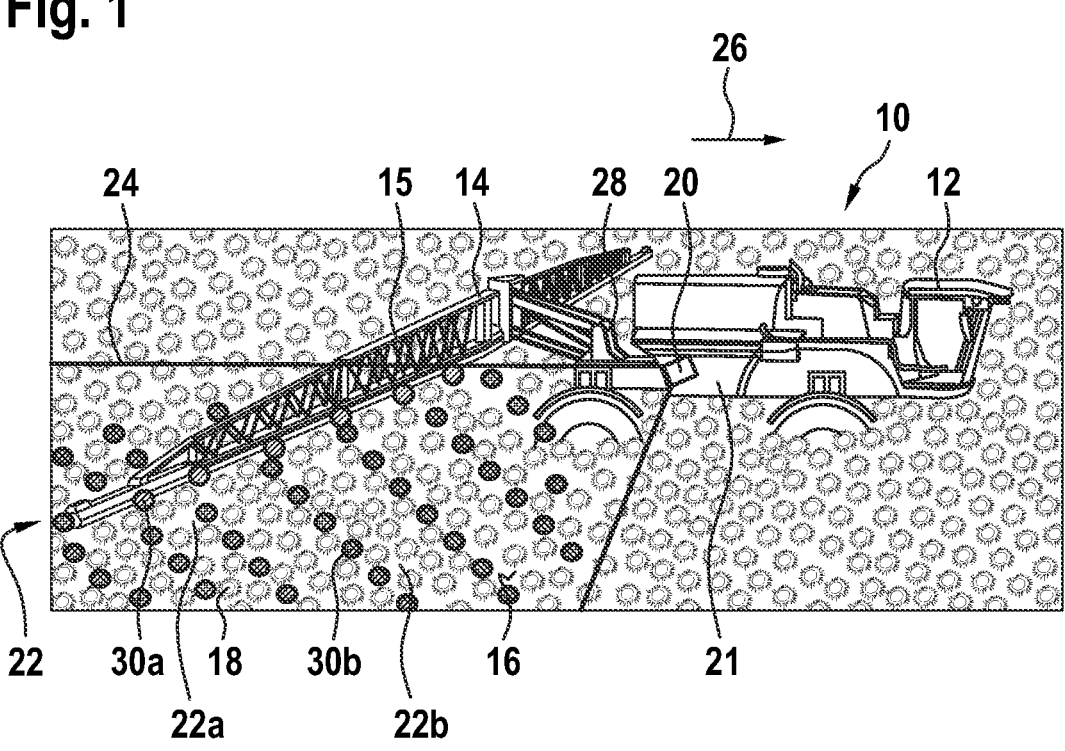
FIG. 1 a schematic representation of an agricultural working machine with an agricultural working tool.

FIG. 1 shows an agricultural working machine, which is marked in its entirety with the reference number 10.

The agricultural working machine 10 comprises a traction engine 12, which is designed as what is referred to as a "self-propelled machine".

The agricultural working machine 10 further comprises an agricultural working tool 14, which in the exemplary embodiment shown is an agricultural field sprayer 14 having a sprayer boom 15. The agricultural working tool 14 or the field sprayer 14 is designed to treat an agricultural area 16, in particular a plant crop 18 of the agricultural area 16, or to treat it with a plant protection agent.

The agricultural working machine 10 further comprises a radar sensor 20 for ascertaining status information relating to a status of the agricultural working tool 20 or the field sprayer 14.

For this purpose, the radar sensor 20 is arranged laterally on the traction engine 12 or on a chassis 21 of the traction engine 12 in order to track the field sprayer 14, in particular the sprayer boom 15 of the field sprayer 14, and furthermore a field section 22 of the agricultural area 16, which lies in a (3D) measuring range 24 of the radar sensor 20. The tracked field section 22 comprises both a field section 22a located directly below the field sprayer 14 or the sprayer boom 15 and a field section 22b of the agricultural area 16 located ahead of the field sprayer 14 or the sprayer boom 15 in the direction of movement 26 of the agricultural working machine 10.

The agricultural working machine 10 further comprises a positioning unit 28 designed to adjust a position and/or orientation of the field sprayer 14 relative to the tracked field section 22 of the agricultural area 16 in response to the status information.

In order to ascertain the status information regarding a status of the field sprayer 14, the agricultural working machine 10 further comprises a computing unit (not shown) which is arranged to generate a 3D point cloud using radar sensor data from the radar sensor 20. The computing unit is in particular configured to determine a line contour from the tracked measuring points 30a associated with the sprayer boom 15 and a 3D surface contour or a 3D plane averaged therefrom from the measuring points 30b associated with the field section 22, in particular to the plant crop 18 in the field section 22.

On this basis, the status information regarding a current and/or precalculated status, e.g. a vertical distance of the sprayer boom 15 to the tracked field section 22 or the plant crop 18 in the field section 22, can then be ascertained in order to control the positioning unit 28 as a function thereof and to achieve or adjust a vertical target distance of the sprayer boom 15 to the tracked field section 22 or the plant crop 18 in the field section 22.

Figure 2:
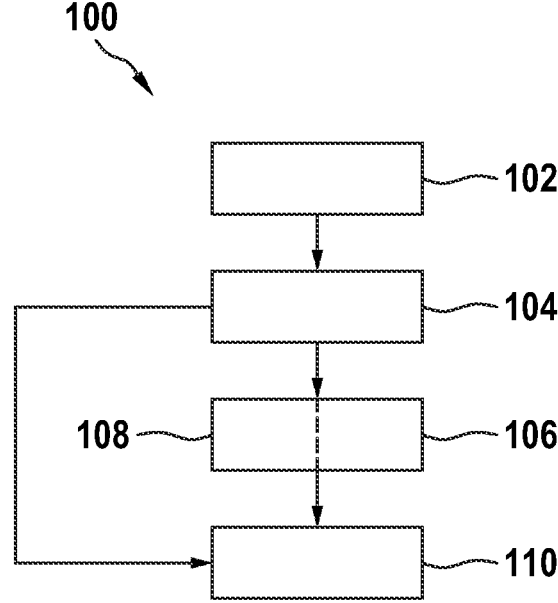
FIG. 2 a flowchart of a method according to an exemplary embodiment.

FIG. 2 shows a flowchart of an exemplary embodiment of the approach presented herein as a method 100 for ascertaining status information regarding a status of an agricultural working tool 14 of an agricultural working machine 10 for treating an agricultural area 16. The method 100 comprises a step of tracking 102 the agricultural working tool 14 using a radar sensor 20 in order to obtain radar sensor data. The method 100 further comprises a step of ascertaining 104 the status information regarding the status of the agricultural working tool 14 using the radar sensor data of the radar sensor 20 by means of a computing unit.

The method 100 further comprises an optional step of storing 106 the status information in a storage unit of the agricultural working machine or an external storage unit, in particular a cloud, and/or outputting 108 the status information to a display unit of the agricultural working machine or an external display unit, in particular a smartphone or tablet. Alternatively or additionally, the method comprises an optional step of controlling and/or regulating 108 a unit 28 of the agricultural working machine 10, in particular the agricultural working tool 14 and/or a positioning unit 28 for the agricultural working tool 14 and/or a drive unit of the agricultural working machine 10, depending on the ascertained status information by means of the computing unit, in order to achieve and/or adjust a target status of the agricultural working tool 14.

What is claimed is:

1. A method for ascertaining status information regarding a status of an agricultural working tool of an agricultural working machine used for treating an agricultural area, comprising:
   tracking the agricultural working tool relative to the agricultural area by way of a radar sensor in order to obtain radar sensor data, the agricultural working tool coupled to the agricultural working machine;
   ascertaining the status information regarding the status of the agricultural working tool using the radar sensor data of the radar sensor by way of a computing unit; and
   moving the agricultural working tool relative to the agricultural area based on the status information,
   wherein during the tracking, the radar sensor tracks a position of at least one radar marker arranged on the agricultural working tool.

2. The method according to claim 1, wherein:
   during the tracking step, a field section of the agricultural area located directly below the agricultural working tool and/or a field section of the agricultural area located ahead of the agricultural working tool in the direction of movement of the agricultural working machine is further tracked in order to ascertain the status information.

3. The method according to claim 1, wherein:
   during the ascertaining step, using the obtained radar sensor data, a 3D point cloud of the agricultural working tool and the tracked field section is generated by way of the computing unit in order to ascertain the status information.

4. The method according to claim 3, wherein:
   during the step of ascertaining, using the generated 3D point cloud, a 3D surface contour, in particular one or a plurality of averaged 3D planes for the tracked field section is/are determined by way of the computing unit in order to ascertain the status information.

5. The method according to claim 1, wherein the status information comprises a current status and/or a precalculated status of the agricultural working tool.

6. The method according to claim 1, wherein the status is selected from the group consisting of:
   (a) position and/or orientation of the agricultural working tool relative to the tracked field section of the agricultural area and/or the agricultural working machine,
   (b) vertical distance from the agricultural working tool to the tracked field section of the agricultural area,
   (c) magnitude and/or direction of a velocity of the agricultural working tool relative to the agricultural area, and
   (d) a combination of at least two of (a), (b), and (c).

7. The method according to claim 1, further comprising storing the status information in a storage unit of the agricultural working machine or an external storage unit, and/or outputting the status information to a display unit of the agricultural working machine or an external display unit.

8. The method according to claim 1, further comprising controlling and/or regulating the agricultural working tool and/or a positioning unit for the agricultural working tool and/or a drive unit of the agricultural working machine depending on the status information ascertained by way of the computing unit in order to achieve and/or adjust a target status of the agricultural working tool.

9. The method according to claim 8, wherein the target status is selected from the group consisting of:

(a) target position and/or target orientation of the agricultural working tool relative to the tracked field section of the agricultural area and/or the agricultural working machine, (b) vertical target distance from the agricultural working tool to the tracked field section of the agricultural area, (c) magnitude and/or direction of a target velocity of the agricultural working tool relative to the agricultural area, and (d) a combination of at least two of (a), (b), and (c).

10. The method according to claim 1, wherein the agricultural working tool is selected from the group consisting of: a field sprayer with a sprayer boom for spreading a spraying agent and/or a fertilizing agent, and a rotating working tool.

11. The method according to claim 1, wherein a computing unit is configured to perform the method.

12. The method according to claim 1, wherein the rotating working tool is selected from the group consisting of: a rake, a planting machine or a finger hoe.

13. An agricultural working machine, comprising:

an agricultural working tool configured to treat an agricultural area;

a radar sensor configured to ascertain status information relating to a status of the agricultural working tool, the radar sensor configured to track the agricultural working tool and to obtain radar sensor data for ascertaining status information relating to the agricultural working tool; and a positioning unit configured to adjust a position and/or an orientation of the agricultural working tool relative to the tracked field section of the agricultural area depending on the status information.

14. The agricultural working machine according to claim 13, further comprising at least one radar reflector arranged on the agricultural working tool and configured to track the agricultural working tool.

15. The agricultural working machine according to claim 13, wherein:

the radar sensor for ascertaining the status information is configured to further track a field section of the agricultural area, and the field section of the agricultural area is a field section located directly below the agricultural working tool and/or a field section of the agricultural area located ahead of the agricultural working tool in the direction of movement of the agricultural working machine.

16. The agricultural working machine according to claim 13, wherein the radar sensor is arranged laterally on a traction engine or an attachment or a trailer of the agricultural working machine in order to track the agricultural working tool.

17. The agricultural working machine according to claim 13, wherein the agricultural working tool is selected from the group consisting of:

a field sprayer having a sprayer boom for spreading a spraying agent and/or a fertilizing agent, a windrower, and a planting machine.

18. The agricultural working machine according to claim 13, further comprising a computing unit which is configured to (i) obtain radar sensor data from an agricultural working tool of an agricultural working machine tracked by way of a radar sensor, and (ii) ascertain status information regarding a status of the agricultural working tool using the radar sensor data of the radar sensor.

\* \* \* \* \*